United States Patent [19]
Woerner et al.

[11] 3,884,650
[45] May 20, 1975

[54] WASTE DISPOSAL FROM OXIDATIVE DEHYDROGENATION

[75] Inventors: Rudolph C. Woerner, Houston; Lloyd D. Tschopp, Humble; Carl O. Oelze, Houston, all of Tex.

[73] Assignee: Petro-Tex Chemical Corporation, Houston, Tex.

[22] Filed: July 11, 1973

[21] Appl. No.: 378,292

[52] U.S. Cl. ............................ 55/54; 55/55; 55/56; 203/96
[51] Int. Cl. ............................................ B01d 19/00
[58] Field of Search .......................... 55/53–56, 196, 55/198; 203/76, 83, 96; 260/677, 680 E, 681.5 R

[56] References Cited
UNITED STATES PATENTS

| | | | |
|---|---|---|---|
| 3,073,752 | 1/1963 | Mention | 203/83 X |
| 3,174,262 | 3/1965 | Lutz | 55/198 X |
| 3,679,764 | 7/1972 | Hinton | 260/680 E |

FOREIGN PATENTS OR APPLICATIONS

| | | | |
|---|---|---|---|
| 589,547 | 6/1947 | United Kingdom | 55/54 X |

*Primary Examiner*—Charles N. Hart
*Assistant Examiner*—Richard W. Burks
*Attorney, Agent, or Firm*—N. Elton Dry; Kenneth H. Johnson

[57] ABSTRACT

Reducing carbonyl compounds in waste water by stripping an overhead, enriched in carbonyls, condensing an aqueous portion of the overhead which contains the predominate amount of the carbonyls in the overhead, and destroying the carbonyl concentrate. Operating the stripping unit under vacuum essentially eliminates fouling of the stripping unit, caused by aldehyde polymer formation.

5 Claims, 1 Drawing Figure

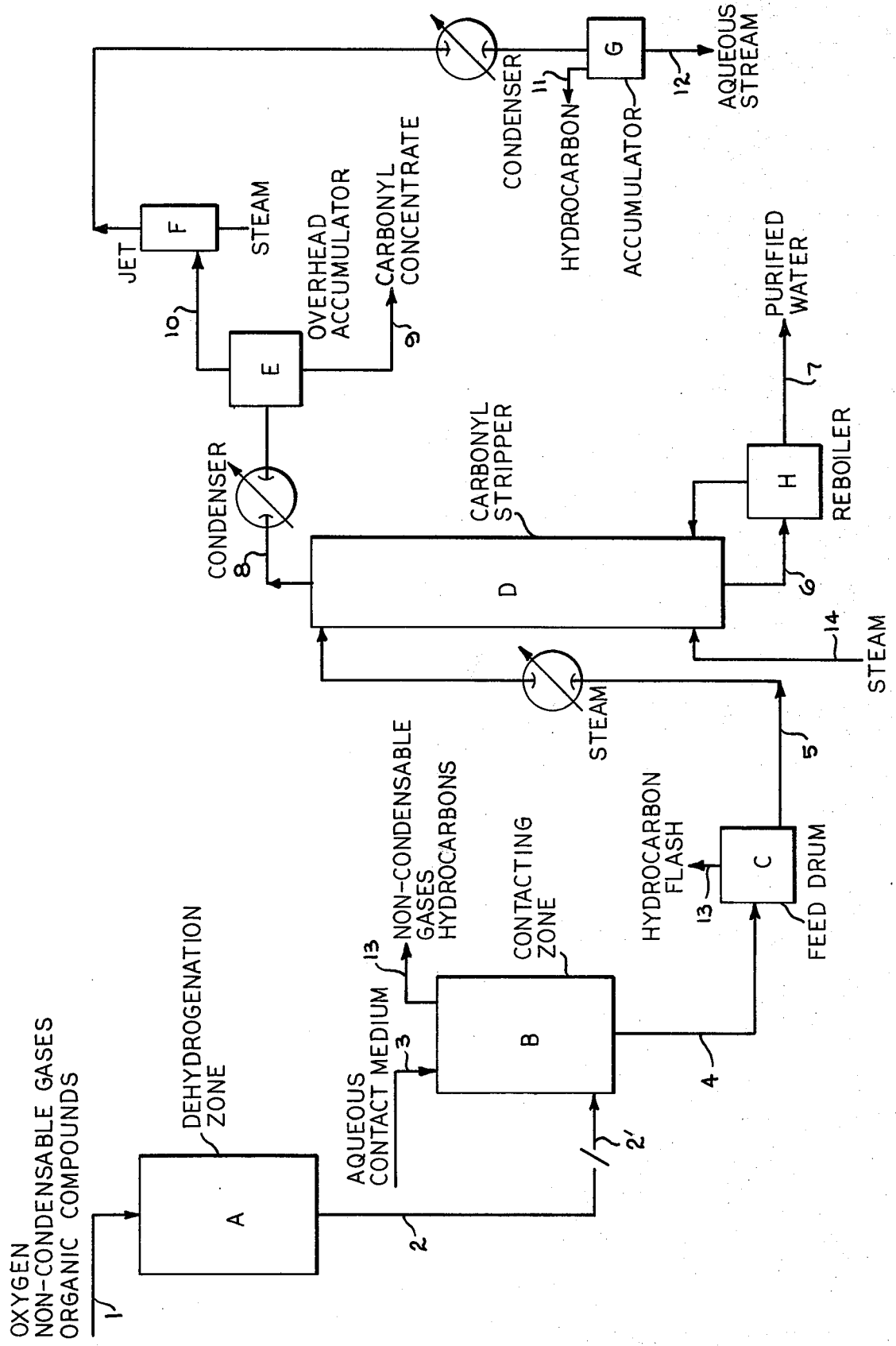

WASTE DISPOSAL FROM OXIDATIVE DEHYDROGENATION

BACKGROUND OF THE INVENTION

This invention relates to the oxidative dehydrogenation of organic compounds to produce organic compounds having a higher degree of unsaturation than the starting material, and to the separation of the unsaturated organic compound product from the reaction mixture of unsaturated organic compounds, relatively noncondensable gases, and a minor proportion of oxygenated compounds. More particularly, however, this invention relates to the efficient disposal of aqueous waste containing the major amount of the oxygenated compounds produced.

Oxidative Dehydrogenation

Unsaturated organic compounds are commercially produced by the catalytic dehydrogenation of more saturated organic compounds. For example, diolefins are produced in large quantities by the dehydrogenation of saturated hydrocarbons or olefins in fixed bed reactors. There are other methods of producing unsaturated organic compounds, for example, butadiene is a by-product in the production of ethylene by cracking aromatics and isobutylene is a by-product of epoxide preparation. Thus, beyond the ordinary economic incentives for improved processes, whereby higher conversions, yields and selectivities of product are obtained, there is the competitive effect of cheaply available by-product materials.

The dehydrogenation of hydrocarbons such as butane, butene, isopentene, or ethyl benzene at elevated temperatures in the presence of catalysts and oxygen are improved processes for the preparation of such unsaturated hydrocarbons as butene, butadiene-1,3, isoprene and styrene. These processes, as good as they are, can and have been improved to further increase productivity, thus allowing them to remain competitive with by-product materials.

Superior results and yields of product are obtained in the improved processes. However, the product streams contain not only the desired unsaturated hydrocarbons, but also various oxygenated compounds, such as aldehydes and other carbonyl compounds.[1] When air is used as the source of the oxygen, the effluent from the dehydrogenation will contain large quantities of relatively noncondensable gases[2], such as nitrogen. The gaseous effluent will also contain varying amounts of steam. It has been one of the principal objects of the improved dehydrogenation processes to provide a process for the separation of the carbonyl and other oxygenated compounds from the gaseous stream containing the hydrocarbons.

[1]Except as expressed otherwise, all reference herein to overall quantities of carbonyl compounds are as determined by ASTM Method D-1089 and reported as acetaldehyde. Generally, the carbonyl compounds will have from 2 to 8 carbon atoms and 1 to 2 carbonyl groups.
[2]The term "noncondensable gases" refers to those gases, other than hydrocarbons, such as nitrogen, $CO_2$ and $CO$, which do not condense under the conditions encountered.

The gaseous mixture to be treated containing the unsaturated hydrocarbon, noncondensable gases and carbonyl compounds may be obtained from a variety of sources. However, the invention is particularly suitable for the purification of gaseous effluents resulting from the oxidative dehydrogenation of hydrocarbons utilizing air or oxygen diluted with noncondensable diluents such as nitrogen or helium. Examples of oxidative dehydrogenation processes are disclosed, e.g. in U.S. Pat. Nos. 3,270,080; 3,303,234; 3,303,235; 3,303,236; 3,303,238; 3,308,182 through 3,308,201; 3,324,195; 3,334,152 and 3,342,890.

Product Purification

The oxygenated compounds are a serious contaminant in the unsaturated hydrocarbon product and must be essentially completely removed in order to have a product of suitable purity, e.g., a product having on the order of a few parts per million carbonyl compounds. The essentially complete removal of the oxygenated compound is quite difficult for several reasons. In the first place, the oxygenated compounds constitute only a very minor percentage of the gaseous stream to be purified. Normally the carbonyl compounds will only constitute less than 5 mol percent of the gaseous stream to be purified and more usually may constitute such as less than or up to 2.5 mol percent of the gaseous stream. The oxygenated compounds are therefore quite difficult to remove because of their low concentrations in the gaseous stream. In addition, the oxygenated compounds may be difficult to separate from the hydrocarbons regardless of their relative concentration. Azeotropes may form between the oxygenated compounds and various hydrocarbons. For instance, an azeotrope is formed between acetaldehyde and butadiene-1,3.

Various processes have been developed which provide for essentially complete removal of carbonyl compounds from a gaseous stream containing only minute quantities of carbonyl compounds. For example, U.S. Pat. No. 3,308,201 to Bowers, et al. discloses a process wherein the gaseous reaction product, i.e, unsaturated hydrocarbons, carbonyl compounds, noncondensable gases and steam are passed to a contacting zone where the gaseous stream is contacted, for example by countercurrent flow, with an aqueous stream of pH of at least 10 or more suitably 11 or 12. At least 90 percent of the carbonyls entering the contacting zone will be removed from the gaseous stream into the aqueous stream. The noncondensable gases and unsaturated hydrocarbons are passed out of the contacting zone for separation elsewhere. The hydrocarbon product is a high purity unsaturated hydrocarbon having less than 250 ppm carbonyls.

Another U.S. Pat. No. 3,336,414 to Woerner, uses boiler blowdown as the alkaline aqueous stream. In a similar fashion, the product hydrocarbon is a highly purified material with the aqueous stream having extracted at least 90 percent of the carbonyl compounds from the product gases.

Other techniques for removing carbonyls are such as that shown in U.S. Pat. No. 3,662,017 to Woerner et al. wherein water is used to scrub reaction gases between compression stages and in the same manner as noted, removes substantial amounts of the carbonyl compounds in the reaction gases.

The prior art has thus produced, by a variety of methods, a very high quality of unsaturated hydrocarbon product and at the same time, it has produced an aqueous waste stream which is very difficult to dispose of.

The carbonyl laden water is unfit for reuse for scrubbing. The water is not easily used for any purpose because of the carbonyl compounds. Attempts to utilize this waste in steam generators results in severe fouling because of the tendency of the carbonyl compounds, particularly the aldehydes, to polymerize at high temperatures. The conventional manner of handling carbonyl laden water has been to cycle it directly to the biological oxidation ponds, however, increased unit productivity, plus increased efficiency in carbonyl removal from product gas streams have placed a substantial overload on the capacity of the ponds. These technical factors, coupled with stricter governmental standards on oxidant discharge have created a substantial problem relative to the disposal of the carbonyl by-product.

SUMMARY OF THE INVENTION

The invention, briefly stated, is a process for removing carbonyl compounds from an aqueous stream comprising feeding said stream to a stripping zone, taking off an overhead portion from said stripping zone, said overhead portion containing a major amount of said carbonyl compounds from said stream, and removing a bottoms portion containing a major amount of water fed to said stripping zone and containing a lesser amount of carbonyl compounds than said stream.

It has been found that the present process will operate most efficiently if it is operated under reduced pressure, i.e., a vacuum can be applied to the system. By reducing the pressure in the system, the operating temperature can be reduced. It was observed that operating under reduced pressure and temperature resulting in almost a total elimination of fouling in the stripping zone. It is believed that the reduction in temperature is the essential difference and that higher operating temperatures tend to cause polymerization of the carbonyl compounds and residual unsaturated compounds in the aqueous stream. However, this has not been conclusively determined and other factors may account for all or a portion of the fouling observed.

Other aspects of the present invention include internal reflux within the stripping zone, condensation of a portion of the overhead to accumulate the carbonyl compounds, recycle of the purified water and ecological disposal of the waste.

The process of this invention may be applied to the purification of aqueous streams employed in conjunction with the dehydrogenation of a wide variety of produced organic compounds.

Such compounds normally will contain from 2 to 20 carbon atoms, at least one

grouping, a boiling point below about 350°C., and such compounds may contain other elements, in addition to carbon and hydrogen such as halogens, nitrogen and sulphur. Preferred are compounds having from 2 to 12 carbon atoms, and especially preferred are compounds of 3 to 6 or 8 carbon atoms.

Among the types of organic compounds which may be dehydrogenated by means of the process of this invention are nitriles, amines, alkyl halides, alkyl aromatic compounds, alkyl heterocyclic compounds, cycloalkanes, alkanes alkenes and the like. Illustration of dehydrogenations include propionitrile to acrylonitrile, ethyl chloride to vinyl chloride, methyl isobutyrate to methyl methacrylate, 2-chlorobutene-1, or 2,3 dichlorobutane to chloroprene, ethyl pyridine to vinyl pyridine, ethylbenzene to styrene, isopropylbenzene to α-methyl styrene, ethylclohexane to styrene, cyclohexane to benzene, methane to ethylene and acetylene, ethane to ethylene to acetylene, propane to propylene or methyl acetylene, or allene, isobutane to isobutylene, n-butane to butene and butadiene-1,3, butene to butadiene-1,3 and vinyl acetylene, methyl butene to isoprene, cyclopentane to cyclopentene and cyclopentadiene-1,3, n-octane to ethyl benzene and orthoxylene, monomethylheptanes to xylenes, propylene to benzene, 2,4,4-trimethylpentane to xylenes, the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3-dichlorobutane, 1,4-dichlorobutane, the chlorofluoroethanes, methyl pentane, and the like.

Suitable dehydrogenation reactions are the following: acyclic compounds having 4 to 5 non-quaternary contiguous carbon atoms to the corresponding olefins, diolefins or acetylenes having the same number of carbon atoms; aliphatic hydrocarbons having 6 to 16 carbon atoms and at least one quaternary carbon atoms to aromatic compounds such as n-hexane or the n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be dehydrogenated are hydrocarbons with a particularly preferred class being acyclic non-quaternary hydrocarbons having 3 to 4 to 5 contiguous carbon atoms or ethyl benzene and the preferred products are n-butene-1 or 2, butadiene-1,3, vinyl acetylene, 2-methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent.

The organic compound to be dehydrogenated is contacted with oxygen in order for the oxygen to oxidatively dehydrogenate the compound. The oxygen may be supplied to the organic compound from any suitable source as by feeding oxygen to a dehydrogenation zone for example as disclosed in U.S. Pat. No. 3,207,810 issued Sept. 21, 1965. Oxygen may be fed to the reactor as pure oxygen, as air, as oxygen-enriched air, oxygen mixed with diluents, and so forth. Oxygen may also be supplied by means of a transport or moving oxidant type of process such as disclosed in U.S. Pat. No. 3,050,572 issued Aug. 21, 1962 or U.S. Pat. No. 3,118,007 issued Jan. 14, 1964. The term oxidative dehydrogenation process when used herein means a process wherein the predominant mechanism of dehydrogenation is by the reaction of oxygen with hydrogen.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor or solid oxidant to the reactor) in the dehydrogenation zone in an amount from about 0.2 to 1.5, preferably 0.3 to 1.2, mols per mol of $H_2$ being liberated from the organic compound. Ordinarily the mols of oxygen supplied will be in the range of from 0.2 to 2.0 mols per mol of organic compound to be dehydrogenated and for most dehydrogenations this will be within the range of 0.25 to 1.5 mols of oxygen per mol of organic compound.

Halogen or other additives may be present in the dehydrogenation step such as disclosed in the above cited patents, e.g., U.S. Pat. No. 3,334,152 issued Aug. 1, 1967. Means for separating halogen may also be incorporated in the dehydrogenation reactor or downstream.

Preferably, the reaction mixture contains a quantity of steam or diluent such as nitrogen with the range generally being between about 1 or 2 and 40 mols per mol of organic compound to be dehydrogenated.

The temperature for the dehydrogenation reaction generally will be at least about 250° C., such as greater than about 300° C. or 375° C., and the maximum temperature in the reactor may be about 700°C. or 800°C. or perhaps higher such as 900°C. under certain circumstances. However, excellent results are obtained within the range of or about 350°C. to 700°C., such as from or about 400°C. to or about 675°C. These temperatures are measured at the maximum temperature in the dehydrogenation zone.

The remaining conditions, catalysts, flow rates and the like for oxidative dehydrogenation are known to those skilled in the art and may be e.g., as disclosed in U.S. Pat. No. 3,334,152 issued Aug. 1, 1967, or any of the remaining patents cited herein.

DESCRIPTION OF A PREFERRED EMBODIMENT

The invention, particularly its unique ecological value, can be best appreciated by an example of the process. Reference shall be made to the FIGURE where the process is represented in a flow type arrangement.

It should be appreciated that the various elements of "hardware," i.e., refining equipment are conventional, and once the skilled technician has been apprised of the function and certain designated conditions of operation, the specific equipment is a matter of professional choice. It is intended that these obvious hardware alternatives be a part of this invention.

In the FIGURE a hydrocarbon stream 1 comprising butene-2 as the major component is dehydrogenated to butadiene-1,3 in reactor A. The feed to reactor A comprises butene-2, air, and steam. The effluent stream 2 comprises butadiene-1,3, unreacted butene, carbonyl compounds, steam, noncondensable gaseous components such as nitrogen and various dehydrogenation by-products such as $CO_2$, CO and the like.

The product stream 2 is fed to contacting zone B. As indicated in the FIGURE, there will generally be intermediate treatment of the product stream prior to its arrival in contacting zone B. For example, there may be cooling and condensation of the principal quantity of steam. There may also be a compression zone. The composition entering contacting zone B as a stream 2' exclusive of any water will comprise from 3.5 to 80 mol percent of unsaturated organic compound, from 0.0005 to 2.5 mol percent of carbonyl compounds and from 20 to 93 mol percent of noncondensable gases, all based on total mols of gaseous composition. The oxygen content will generally be less than 10 mol percent of stream 2'. The stream 2' may also contain hydrocarbon by-products and unconverted hydrocarbons such as olefins or unsaturated hydrocarbons. The composition of stream 2 exclusive of any water may be within the same ranges as given for stream 2'.

A preferred or usual composition 2' to be fed to contacting zone B will comprise, exclusive of any water present, from 5 to 65 mol percent of unsaturated hydrocarbons, from 0.005 to 1.2 mol percent of carbonyl and from 45 to 89 mol percent of the noncondensable gases. A particularly preferred composition 2' contains from 8 to 65 mol percent butadiene-1,3, from 0.1 to 40 mol percent butene, from 40 to 75 mol percent nitrogen, and from 0.03 to 0.30 mol percent carbonyl compounds.

The gaseous stream 2' is contacted with an aqueous medium in any type of equipment or apparatus for intimately contacting gases and liquids, such as tray columns, including cross-flow plate and counterflow plate types, bubble cap columns and spray systems including spray towers (open or packed), cyclonic spray towers, venturi scrubbers, and so forth. Preferred contacting equipment is plate columns (may be perforated, valve, bubble cap, and so forth) and packed columns.

The aqueous medium may either be water or water with adjusted pH of 10 or more preferably 11 to 12. The conditions of the contacting zone may vary depending on the precise composition being contacted and the nature of the aqueous medium used for scrubbing, however, those conditions are not a part of this invention and are found in the prior art previously described.

The aqueous medium will remove the principal amount of carbonyl compounds contained in stream 2'. The gaseous stream passes out of the contacting zone B as stream 3 to be subjected to further processing for recovery of product, butadiene-1,3, for example, recyclable butenes and the like. The aqueous effluent 4 from contacting zone B may contain from 0.015 to 0.12 mol percent of carbonyl compound, from 0.004 to 0.05 mol percent of hydrocarbon compounds and from 99.78 to 99.97 mol percent of water. In addition there may be small amounts of carbon dioxide, nitrogen and oxygen dissolved in stream 4, but this is of no consequence in regard to water purity. A preferred composition for stream 4 would be from 0.03 to 0.07 mol percent carbonyl compounds, from 0.02 to 0.04 mol percent hydrocarbon compounds and from 99.86 to 99.91 mol percent water. A more preferred composition for stream 4 would contain from 0.045 to 0.06 mol percent carbonyl compounds, from 0.036 to 0.042 mol percent hydrocarbons and from 99.86 to 99.88 mol percent water.

The aqueous stream 4 will generally have a temperature in the range of 50° to 150° F. In the preferred embodiment shown in the FIGURE, the system is provided with a feed drum C where a portion of the hydrocarbons contained in stream 4 are flashed overhead. The flashing is the result of pressure reduction in drum C. Stream 13 will contain butadiene as well as some carbon dioxide. Only a small portion of stream 4 will be flashed as overhead 13, however, from 60 to 95 mol percent of the hydrocarbons other than carbonyl compounds may be removed from stream 4. The overhead stream 13 is preferably recycled to the compression zone described hereinabove in regard to stream 2-2' prior to entry into contacting zone B.

The stream 5 from feed drum C is passed through a heater where steam is used to adjust the temperature to a temperature in the range of 80° to 220° F. Preferably the temperature is adjusted in accordance with the pressure employed in carbonyl stripper D and in the range up to 212° F. As noted above, it has been found advantageous to operate the stripper D at reduced pressure. Thus, since it is desired to inhibit the amount of water passing out of stripper D as overhead, the temperature of stream 5 is adjusted such that it will be below the vaporization point of water under the pressure conditions in the stripper. Generally pressures in the range of from 1.0 psia to atmospheric will be employed and preferably from 1.0 or 2.0 to 7.5 psia. More preferably, the operating pressure of the stripper D will be 2.5 to 5.0 psia. The pressure will be slightly higher above the top tray and slightly lower below the bottom tray, because of the pressure drop in the tower.

The reduced pressure in stripper D can be achieved in any conventional manner, for example compressors, fans, jets and the like. A preferred method is the use of a steam jet F inserted, as shown in the FIGURE, into the line at a point downstream of the stripper. The pressure on the system can be controlled by controlling the amount of air or more preferably an inert gas such as nitrogen or non-condensible hydrocarbon, such as butene, injected upstream of the jet. Generally the temperature of the stripping zone will be in the range of 80° to 179° F or more preferably 90° to 178° F at reduced pressures.

The feed stream 5 entering carbonyl stripper D as noted can have a greatly reduced hydrocarbon content from stream 4 or may be substantially the same composition as stream 4 with the hydrocarbons being taken overhead in stream 8 from stripper D with the carbonyl compounds. A preferred composition for stream 5 comprises from 0.03 to 0.07 mol percent carbonyl compounds, from 0.003 to 0.004 mol percent hydrocarbons and from 99.92 to 99.97 mol percent water. A more preferred stream 5 would contain 0.045 to 0.06 mol percent carbonyl compounds, 0.003 to 0.004 mol percent hydrocarbons, and 99.93 to 99.95 mol percent water.

The carbonyl stripper D is any apparatus or equipment which will carry out the stripping as described and can be plate tray, cap tray, bubble tray, baffle tray or combination arrangements of such components. An internal reflux is maintained by control of conditions within the tower, thus eliminating the need for an external reflux. The retention time of the liquid on the trays will depend to some extent on the nature of the water being treated; however, the holdup time in the stripper D will generally be from a few minutes to a few hours, e.g., 30 minutes to 4 to 5 hours. Control of the flow rate of overhead stream 8 in the stripper D can be maintained in any conventional manner, however, as shown in the FIGURE a reboiler H serves quite well in this regard. Steam can also be added directly to tower D via line 14.

In accordance with the present invention, the carbonyl compounds are substantially completely removed from the aqueous stream 5. Similarly, the hydrocarbons are substantially removed to provide a stream 6 which is at least 99.90 mol percnet water and more preferably contains less than 40 ppm. (mols) of combined carbonyl compounds and hydrocarbons, and more preferably less than 20 ppm. A portion of stream 6 coming from the bottom may be employed in reboiler D, and the balance discharged as stream 7, having substantially the same composition as stream 6. The reboiler may, for example, be a kettle type or the circulating type. In the case of the former type, where stream 7 is drawn from the kettle there may be a lower concentration of carbonyl compounds than found in stream 6, since some carbonyl will flash in the kettle. Where stream 7 is drawn off before passing into the reboiler, i.e., circulating reboiler, the composition of stream 6 and 7 will be the same. Stream 7 can be cooled and recycled to contacting zone B or sent to the biological pond for final treatment and returned to the surface water supply.

The overhead stream 8 contains the carbonyl compounds from stream 5, concentrated several hundred times. The gaseous overhead contains at least 80 percent (by weight) and more preferably at least 85 percent of the carbonyl compounds entering stripper D in stream 5. This gaseous stream 8 will normally comprise from 0.2 to 3.8 mol percent carbonyl compounds, from 0.008 to 0.5 mol percent hydrocarbons, and from 95.7 to 99.8 mol percent water. Preferably this stream will contain from 1.5 to 2.7 mol percent carbonyl compounds, from 0.08 to 0.20 mol percent hydrocarbons, and from 97.1 to 98.4 mol percent water. This gaseous overhead 8 is passed to a condenser and the aqueous portion collected in overhead accumulator E. The stream 9 will contain substantially all of the carbonyl compounds from overhead stream 8. Stream 9 is now in a concentrated form which can be destroyed by incineration.

Alternatively, carbonyl stream 9 can be subjected to further concentration in a second stripping unit (not shown) comprising essentially the same components as the system just described. It has been determined that in the second or subsequent stripping units that the increased concentration of carbonyl compounds will require a lower temperature of operation for the accumulator for the second stripping tower. Otherwise the higher vapor pressure of the carbonyls, resulting from the increased concentration of carbonyls, would require higher pressures to maintain the carbonyls in solution in the accumulator at the same temperature as employed, for example, in accumulator E. Higher pressure in the second accumulator would require higher operating temperature in the second stripper to overcome the increase in system pressure. However, increased operating temperatures in the second stripper may be undesirable because of increased likelihood of polymerization of the concentrated carbonyls and fouling of the stripper.

Lower operating temperatures in the second or subsequent stripping units may or may not be an advantage since lower temperatures may require cooling or refrigeration equipment. For example, an overhead accumulation from the second stripper having a carbonyl concentration of around 0.3 mol percent would require an accumulator temperature of 125° F. at 2.8 psia. If the carbonyl concentration were concentrated approximately four times, i.e., to about 1.4 mol percent, the operating temperature of the accumulator could be only 100° F, at 2.8 psia.

The gaseous stream 10 from overhead accumulator E contains those hydrocarbons not previously removed and possibly some carbon dioxide and small amounts of carbonyls. This stream conmingles with the steam in jet F and passes through a condenser and accumulator to recover the steam. The stream 12 may also be destroyed by incineration or recycled to an appropriate point in the overall purification system; for example it could be introduced into stripper D.

Prior to the overhead accumulator E and jet F, care should be taken to prevent air leaks in the system, since a portion of the carbonyl compounds (noticeably the aldehydes) may become entrained in the air.

The following brief specific examples will further aid in appreciating the remarkable benefit possible from this invention.

EXAMPLE 1

Referring to the FIGURE, the feed stream 4 is derived from aldehyde scrubbing of an oxidative dehydrogenation reaction stream. The make-up of various streams in the system is provided in TABLE I. In addition, the operating temperatures are set out in TABLE I. The operating pressure at the bottom of the stripper D is about 3.7 psia, at the overhead about 3.4 psia, and in accumulator E after condensation of the overhead aqueous portion, about 2.8 psia. The vacuum is pulled by a Graham single stage model C steam jet air ejector (Graham Manufacturing Co., Inc.). Steam is applied at 9 lbs./hour through line 14. The temperature in stripper D is about 150° F.

EXAMPLE 2

A run carried out at slightly above atmospheric pressure and at higher temperature, e.g., stream 4, 95° F; stream 5, 95° F; stream 6(7), 216° F; stream 8, 214° F. The temperature in stripper D ran about 215° F. The unit was on carbonyl feed for a total of 40 days. At shutdown the unit was fouled. The fouling occurred to varying degrees throughout the tower and consisted of brown or reddish-orange material, which are the characteristic colors of aldehyde polymers. A series of samples during the run gave the results shown in TABLE II. Analysis was by both wet methods and chromatographic. Both data are given and are in relative agreement.

EXAMPLE 3

A run employing vacuum conditions, i.e., the unit was operated at about ⅓ atmosphere and 150° F, was shut down at 79 days; examination of both tower and trays show them to be relatively clean with only a slight amount of a black, oily type deposit on the trays. The material does not appear to be an aldehyde polymer. The unit was restarted without clean up and has run continuously for over 180 days. Two samples taken during the run show the same high degree of concentration of carbonyls as was achieved at atmospheric conditions in Example 2. The results of the sampling are set out in TABLE III.

TABLE I

| | STREAM 4 | | STREAM 5 | | STREAM 6(7) | | STREAM 8 | | STREAM 9 | | STREAM 10 | | STREAM 13 | |
|---|---|---|---|---|---|---|---|---|---|---|---|---|---|---|
| | Feed | | To Stripper D | | Bottoms | | Overhead | | Carbonyl Concentrate | | To Jet F | | Hydrocarbon Flash | |
| Component | Lbs/Hr | PPm (Wt) | Lbs/Hr | PPm (Wt) | Lbs/Hr | PPm (Wt) | Lbs/Hr | Wt % | Lbs/Hr | Wt % | Lbs/Hr | Wt % | Lbs/Hr | Wt. % |
| Air | — | — | — | — | — | — | — | — | — | — | 1.4[1] | 80.65 | — | — |
| Carbon Dioxide | 0.144 | 586 | 0.045 | 184 | — | — | 0.045 | 0.48 | | | 0.045 | 2.59 | 0.099 | 18.54 |
| Acetaldehyde | 0.222 | 904 | 0.220 | 898 | .002 | 8 | 0.218 | 2.31 | 0.114 | 1.25 | 0.104 | 5.99 | 0.002 | 0.38 |
| Acrolein | 0.113 | 460 | 0.112 | 457 | .001 | 4 | 0.111 | 1.17 | 0.056 | 0.61 | 0.055 | 3.17 | 0.001 | 0.19 |
| Hydrocarbon | 0.492 | 2004 | 0.073 | 298 | — | — | 0.073 | 0.77 | — | — | 0.073 | 4.21 | 0.419 | 78.46 |
| Water | 244.563 | 99.60% | 244.550 | 99.82% | 244.55 | 99.99% | 9.000 | 95.27 | 8.950 | 98.14 | 0.059 | 3.39 | 0.013 | 2.43 |
| Total | 245.534 | 100% | 245.0 | 100% | 244.553 | 100% | 9.447 | 100% | 9.120 | 100% | 1.736 | 100% | .534 | 100% |
| Temp. °F of | 110° | | 150° | | 150° | | 150° | | 100° | | 100° | | 90° | |

[1] estimated air leakage into system.

TABLE II (PPM BY WEIGHT)

| SAMPLE NO. | STREAM | Wet Chemical C=O as Acetaldehyde | CHROMATOGRAPHIC | | | |
|---|---|---|---|---|---|---|
| | | | Acetaldehyde | Acrolein | Acetone | Total C=O as Acetaldehyde |
| 8–1 | Feed 5 | 186 | 48 | 23 | 238 | 246 |
| | Bottom 6 | 57 | 5 | 3 | 88 | 75 |
| | Overhead 9 | 13,889 | 4,440 | 1,040 | 13,052 | 15,179 |
| 8–8 | Feed 5 | 508 | 302 | 139 | 47 | 447 |
| | Bottom 6 | 111 | 56 | 5 | 5 | 66 |
| | Overhead 9 | 40,753 | 30,359 | 9,856 | 2,612 | 40,106 |
| 8–21 | Feed 5 | 587 | 378 | 176 | 38 | 546 |
| | Bottom 6 | 145 | 45 | 17 | 15 | 69 |
| | Overhead 9 | 37,007 | 24,292 | 9,340 | 1,814 | 33,036 |

TABLE III (PPM BY WEIGHT)

| SAMPLE NO. | STREAM | Total C=O as Acetaldehyde | CHROMATOGRAPHIC | | | | Flow Rate Pounds/Hr. Total Amount |
|---|---|---|---|---|---|---|---|
| | | | Acetaldehyde | Acrolein | Acetone | Formaldehyde* | |
| 2–16 | Feed 5 | 1,165 | 465 | 290 | 22 | 309 | 363.6 |
| | Bottoms 6 | 448 | <1 | <1 | — | 305 | 370.3 |
| | Overhead 9 | 17,312 | 12,410 | 6,950 | 1,300 | — | 3.5 |
| | " 10 | 3,540 | 2,174 | 2,410 | 870 | — | — |
| 2–20 | Feed 5 | 1,092 | 409 | 264 | 22 | 312 | 378.2 |
| | Bottoms 6 | 401 | 3 | 11 | 5 | 261 | 381.2 |
| | Overhead 9 | 16,122 | 9,260 | 6,960 | 1,720 | — | 5.5 |
| | " 10 | 1,887 | 1,503 | 1,085 | 59 | — | — |

*determined by difference

The invention claimed is:

1. In a process for preparation of butadiene -1,3 comprising
   oxidatively dehydrogenating a stream having butene-2 as the major hydrocarbon component, in the presence of air and stream,
   producing a product stream comprising from 8 to 65 mol percent butadiene -1,3, from 0.1 to 40 mol percent butene, from 40 to 75 mol percent nitrogen, and from 0.03 to 0.30 mol percent carbonyl compounds exclusive of water,
   contacting said product stream with an aqueous medium having a pH of 10 to 12,
   recovering an aqueous stream containing the principal amount of carbonyl compounds from said product stream,
   removing a portion of said hydrocarbons from said aqueous stream, and,
   feeding said aqueous stream to a steam stripping zone,
   wherein the improvement comprises said aqueous stream having from 0.045 to 0.06 mol percent carbonyl compounds, from 0.036 to 0.042 mol percent hydrocarbons and from 99.86 to 99.88 mol percent water,
   said stripping zone operating at a temperature in the range of 80° to 179°F at 2.5 to 5 psia,
   adjusting the temperature of said aqueous stream prior to feeding into said stripping zone to a temperature less than the operating temperature of said stripper,
   maintaining conditions in said stripping zone to provide internal reflux of the material therein,
   withdrawing a gaseous overhead from said stripping zone, said overhead containing at least 80 percent of the carbonyl compounds fed into said stripping zone in said stream,
   condensing an aqueous portion of said gaseous overhead, said condensed portion containing the major amount of carbonyl compounds in said gaseous overhead, and
   withdrawing a liquid bottoms, comprising the major amount of water in said stream and having substantially less carbonyl compounds than said stream.

2. The process according to claim 1 wherein said aqueous stream comprises from 0.03 to 0.07 mol percent carbonyl compounds, from 0.003 to 0.004 mol percent hydrocarbons and from 99.92 to 99.97 mol percent water.

3. The process according to claim 2 wherein the gaseous overhead comprises from 0.2 to 3.8 mol percent carbonyl compounds, from 0.008 to 0.5 mol percent hydrocarbons, and from 95.7 to 99.8 mol percent water.

4. The process according to claim 3 wherein said aqueous concentrate is prepared by cooling and contains substantially all of the carbonyl compounds in the gaseous overhead.

5. The process according to claim 4 wherein said aqueous concentrate is subjected to a second stripping.

* * * * *